United States Patent [19]

Moriyama et al.

[11] Patent Number: 4,804,992
[45] Date of Patent: Feb. 14, 1989

[54] PHOTOGRAPHIC FILM PACKAGE

[75] Inventors: Motonori Moriyama; Ikuo Fujimura; Tsutomu Tanaka; Takeshi Watanabe, all of Tokyo, Japan

[73] Assignee: Fuji Photo Film Co., Ltd., Kanagawa, Japan

[21] Appl. No.: 67,282

[22] Filed: Jun. 29, 1987

[30] Foreign Application Priority Data

| Jun. 30, 1986 | [JP] | Japan | 61-100485[U] |
| Jun. 30, 1986 | [JP] | Japan | 61-100486[U] |
| Oct. 20, 1986 | [JP] | Japan | 61-160591[U] |

[51] Int. Cl.$^4$ .............................. G03B 17/18
[52] U.S. Cl. ................. 354/471; 354/227.1; 354/289.1; 354/465
[58] Field of Search .......... 354/471, 465, 466, 473, 354/474, 475, 289.1, 227.1

[56] References Cited

U.S. PATENT DOCUMENTS

| 3,545,870 | 12/1970 | Burgarella | 354/471 |
| 4,011,571 | 3/1977 | Okuzawa | 354/219 |
| 4,041,508 | 8/1977 | Edamoto et al. | 354/273 |
| 4,372,657 | 2/1983 | Iwata et al. | 354/471 |
| 4,509,848 | 4/1985 | Katsuma et al. | 354/289.1 |

FOREIGN PATENT DOCUMENTS

| 1280047 | 10/1968 | Fed. Rep. of Germany . |
| 48-91936 | 11/1973 | Japan . |
| 52-109837 | 8/1977 | Japan . |
| 1191116 | 5/1970 | United Kingdom . |
| 1524096 | 9/1978 | United Kingdom . |
| 2020048 | 11/1979 | United Kingdom . |
| 1575163 | 9/1980 | United Kingdom . |
| 1584708 | 2/1981 | United Kingdom . |
| 2062881 | 5/1981 | United Kingdom . |
| 1591856 | 6/1981 | United Kingdom . |

Primary Examiner—Russell E. Adams
Attorney, Agent, or Firm—Young & Thompson

[57] ABSTRACT

A disposable film package of the type having a taking lens comprises a film casing; a film cartridge containing a high speed film therein in said film casing; a viewfinder; and a scene brightness indicating member disposed in the viewfinder. The indicating member becomes visible or invisible according to scene brightness conditions. When the indicating member becomes visible, the photographer is thus given warning that an improper exposure would result.

8 Claims, 5 Drawing Sheets

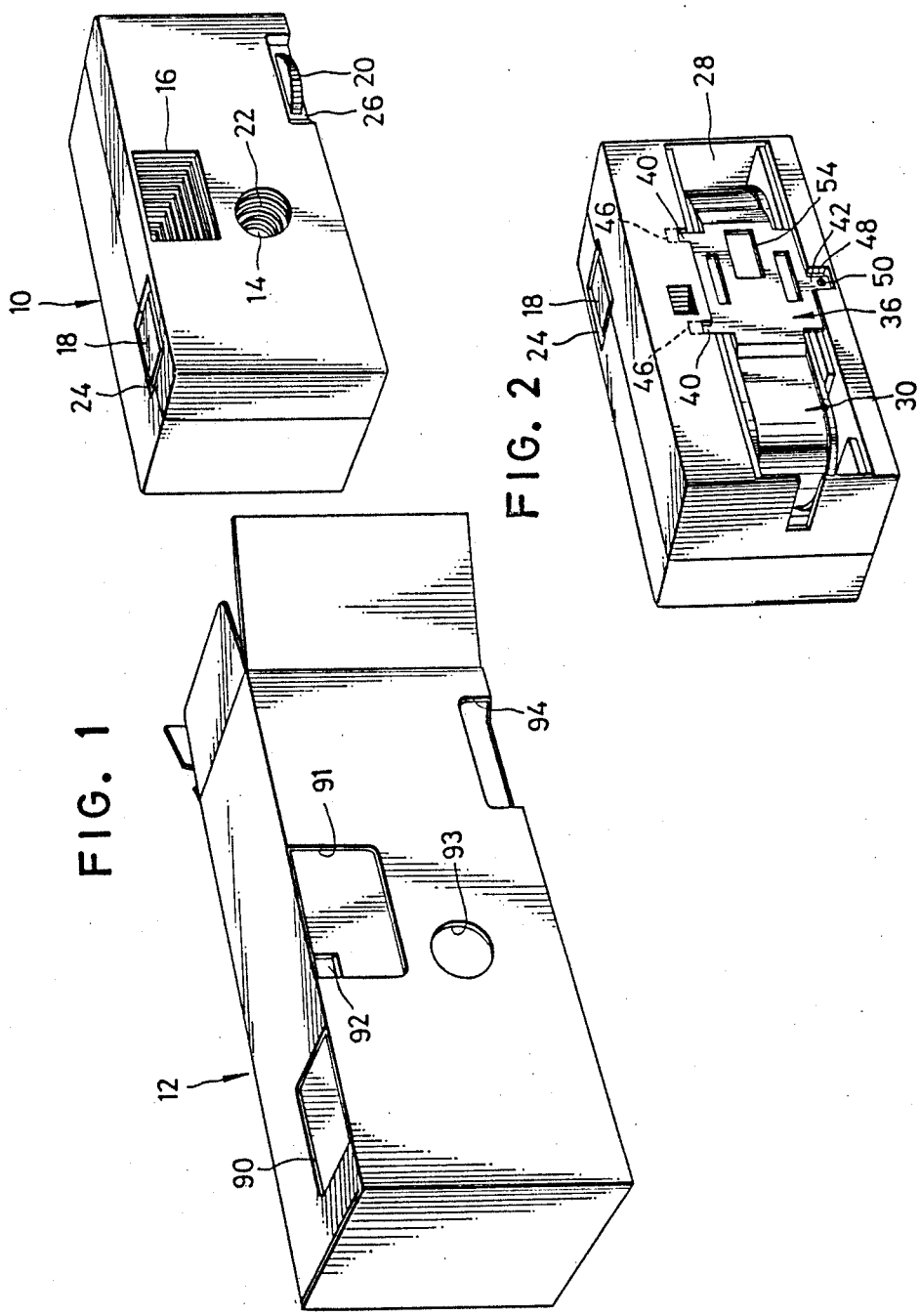

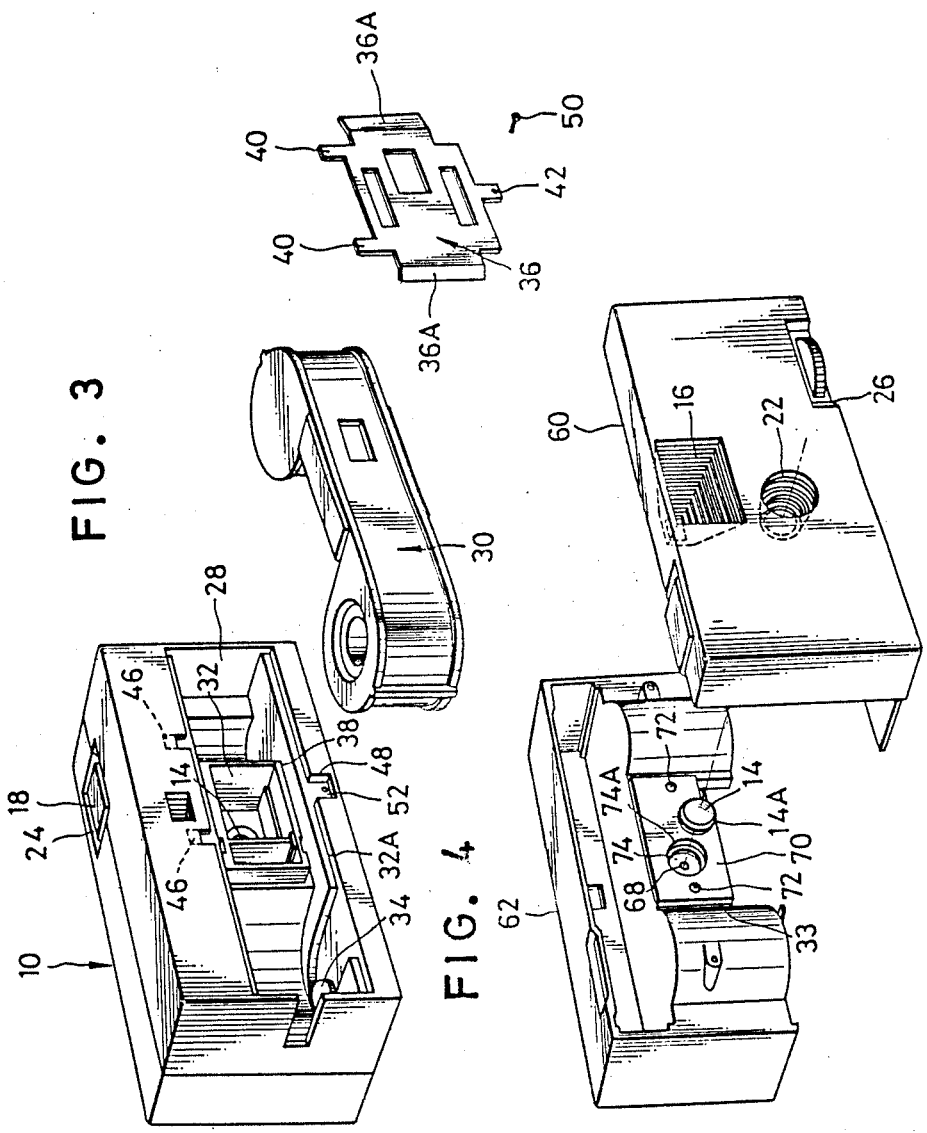

PHOTOGRAPHIC FILM PACKAGE

BACKGROUND OF THE INVENTION

The present invention relates to a photographic film package, and more particularly to a photographic film package in which a high speed film has been previously loaded and which has a lens.

Photographers often carry a camera on trips, excursions or holidays, to take commemorative or souvenir pictures. However, because cameras are precision instruments and relatively massive and heavy, they are sometimes inconvenient to carry about. In addition tot he inconveniences of carrying the camera, one often forgets to take the camera along. In in fact one takes no camera along but decides to take pictures at a resort or the like, it is expensive to buy new camera on the trip. Even if the cost can be ignored, it is often hard to find a camera shop in the vicinity.

Accordingly, it would be quite desirable to be able to buy a low-cost film package with a taking lens, which could be sold wherever photographic film is sold. Such a film package should be disposable after one use. The disposable film package, after the exposure of all frames of the film, would then be forwarded to a photo shop or photo laboratory without removing the film, where the exposed film would be removed and developed to make prints therefrom while the used film package with the taking lens but now without the film would be scrapped.

To keep the cost low, the disposable film package would have to be quite simple in structure, be comprised by only a few parts, and be easily assembled. Accordingly, the exposure control means of the disposable film package would also have to be simple and cheap and desirably capable of effecting a proper exposure control under various photographic conditions. For this reason, it would be desirable to provide a film having a high sensitivity or speed, for instance ASA 100 to 1600, in the disposable film package.

Although such a disposable film package having a simple exposure control and a high speed film would be usable for dark scenes such as indoors, one might forget to reset the exposure control when using the film package under bright photographic conditions such as in sunshine. Conversely, one might forget the necessary adjustment of the exposure control when using the film package indoors after outdoor use. Therefore, there would be various possibilities for error when using such a disposable film package.

OBJECTS OF THE INVENTION

It is therefore an object of the present invention to provide a disposable film package which is simple in structure and operation, and manufacturable at a low cost, thereby being disposable after one use.

It is another object of the present invention to provide a photographic film package which can visibly indicate brightness condition of a scene to be photographed.

It is a still further object of the present invention to provide a photographic film package provided with exposure control means which is quite simple in structure and operation.

SUMMARY OF THE INVENTION

In order to achieve the above and other objects of the invention, the photographic film package with a taking lens, according to the present invention, is comprised by a substantially rectangular film casing; a removable film cartridge containing highly sensitive or high-speed film; a viewfinder formed in said film casing; and means disposed in the viewfinder adapted to visibly indicate the brightness of a scene.

According to a feature of a preferred embodiment of the present invention, the indicating means automatically becomes visible or invisible according to the scene brightness. Specifically, the indicating means comprises a light-responsive member of e.g. a photochromic material, or a combination of a liquid crystal member and a photovoltaic cell. The indicating means disposed in the viewfinder becomes transparent or opaque, depending on scene brightness. For example, the indicating means becomes opaque when the scene is too bright for a film of high sensitivity, thereby warning the photographer to change the exposure.

According to another feature of the present invention, the indicating means is manually operable to indicate scene brightness in the viewfinder. Corresponding to the manual operation of the indicating means, the exposure control is automatically changed to effect a proper exposure.

BRIEF DESCRIPTION OF THE DRAWINGS

These and other objects and features of the present invention will become apparent from the following description taken in conjunction with the preferred embodiments thereof with reference to the accompanying drawings in which like parts are designated by like reference numerals throughout the views of the drawings and in which:

FIG. 1 is an exploded perspective view of the photographic film package of a preferred embodiment of the present invention wherein the internal film casing is removed from and shown to the right of the external casing;

FIG. 2 is a rear perspective view of the internal film casing containing therein a film cartridge;

FIG. 3 is an exploded perspective view of the internal film casing of FIG. 1;

FIG. 4 is an exploded perspective front view of the internal film casing of FIG. 1;

DETAILED DESCRIPTION OF THE INVENTION

Figure 5:
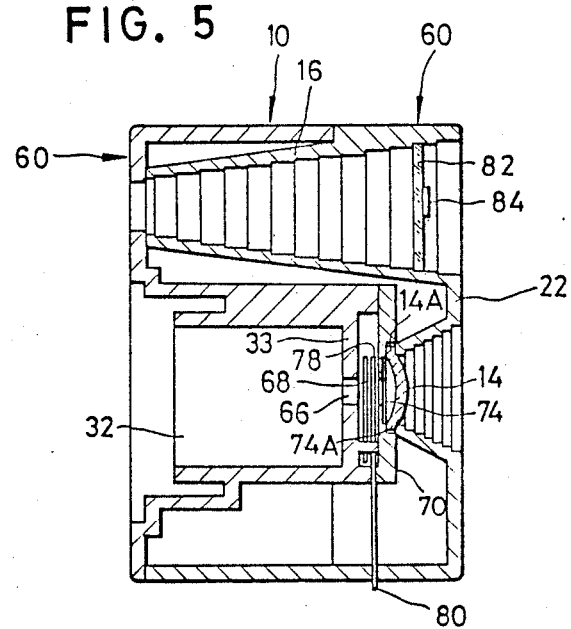
FIG. 5 is a cross sectional view showing the inside of the internal film casing of FIG. 1.

Referring now to FIG. 1, there is shown therein a disposable photographic film package of the present invention which is provided with a taking lens and a simple exposure means and is sufficiently cheap to be disposable. The film package comprises a rectangular box-shaped internal film casing 10 with a film cartridge pre-loaded therein containing a roll of film, in particular a high speed film, and an external casing 12 in which the film casing 10 is encased tightly. The internal film casing 10, which is desirably made of plastic materials, is open at its back and provided with a taking lens 14, a tunnel-like viewfinder 16, a shutter release button 18, and a film advancing knob 20 all of which are well known per se. Surrounding the taking lens 14 is a frusto-conical bore 22 with circular grooves coaxially formed on the inner surface thereof for preventing diffused reflected light from entering the film casing 10 through the taking lens 14. There are also grooves formed on the inner surface of the tunnel-like viewfinder 16 so as to prevent diffused reflected light from entering, thereby to provide an easy and clear observation of an object to be photographed.

In the top wall of the internal film casing 10 is an opening 24 with its inner periphery beveled, which receives therein the shutter release button 18 with its top surface flush with, or even below, the outer surface of the top wall of the film casing 10. At the bottom of the front wall of the internal camera casing 10, there is formed an opening enclosed by a recess 26, which receives therein the film advancing knob 20 without its outer periphery projecting above the outer surface of the front wall of the internal film casing 10.

The internal film casing 10 described above is inserted into and packed tightly in the external casing 12 which is made of a printable cardboard or a printable thin plastic sheet or the like. The external casing 12 is made of a blank having a simple flattened shape to which printing and/or an ornamental surface pattern can be applied. The external casing 12 is formed with a circular opening 93 for the taking lens 14, rectangular openings 91 and 92 to be aligned with the front and rear windows respectively of the tunnel-like viewfinder 16, a rectangular opening 90 for the shutter release button 18, and a generally rectangular opening 94 for the film advancing knob 20. After applying an ornamental surface pattern and the necessary printing, the blank is folded into an open-ended box as the external casing 12.

Referring to FIGS. 2 and 3, the internal film casing 10 with its open back has a film chamber 28 for receiving a film cartridge 30 containing, for example, a 110-size roll of film of ASA 400 to 1600 therein. The film chamber 28 comprises compartments partly surrounded by curved partition walls on both sides of an exposure chamber 32 which will be described in detail later, each compartment being adapted to receive snugly a cylindrical film chamber of the cartridge 30 to be loaded in the internal film casing 10.

Behind the taking lens 14 is a generally rectangular exposure chamber 32 of which the rear periphery 38 lies in the focal plane of the taking lens 14. When the film cartridge 30 is loaded in the internal film casing 10 in such a way as to insert the upper and lower edges of the bridge 56 of the film cartridge 30 into grooves 32A formed between the exposure chamber 32 and the top and bottom inner walls of the internal film casing 10, the rear periphery 38 of the exposure chamber 32 fits against the inside walls of the bridge 56 of the film cartridge 30 and is brought into close contact with the film supported in the film supporting plane of the bridge 56 of the film cartridge 30. The film cartridge 30 is, as is well known, provided with a gear at the bottom of a film wind-up spool (not shown) which is brought into mesh with a gear 34 provided at the bottom of the film casing 10 formed integrally with or cooperating with the film advancing knob 20 when the film cartridge 30 is placed in position in the internal film casing 10. Consequently, the film in the film cartridge 30 can be advanced by rotating the film advancing knob 20 one frame after every exposure.

After the loading of the film cartridge 30, a pressure plate 36 made of a thin sheet metal is attached to the film casing 10 in such a way as to press resiliently the bridge 56 of the film cartridge 30 against the rear periphery 38 of the exposure chamber 32 with a predetermined constant pressure so a to form a labyrinth seal between the bridge 56 and the exposure chamber 32, thereby isolating completely the film from ambient light in spite of the internal film casing 10 being open at the back, and also keeping the film flat.

For attaching the pressure plate 36 to the internal film casing 10, the pressure plate 36 is provided with lugs 40 spaced apart a certain distance along its upper edge and a lug 42 at the middle of its lower edge. On both sides of the pressure plate 36 are portions 36A bent slightly inward. On the other hand, the internal film casing 10 is formed with grooves 46 and a recess 48 at the back of the internal film casing 10. The pressure plate 36 thus formed is attached to the internal film casing 10 with the upper lugs 40 inserted in the grooves 46 and the lower lugs 42 fitted in the recess 48. The lower lug 42 in the recess 48 is further fastened to the internal film casing 10 by a set screw 50 screwed in a threaded bore 52. Due to the provision of the pressure plate 36, the film cartridge 30 is resiliently pressed by the side bent portions 36A of the pressure plate 36 to bring the bridge 56 of the film cartridge 30 into close contact with the rear periphery 38 of the exposure chamber 32, thereby keeping the inside of the exposure chamber 32 light-tight so as to isolate completely the film from ambient light as well as maintaining the film flat in the focal plane of the taking lens 14.

Reference is now had to FIGS. 4 and 5 illustrating the internal film casing 10 exploded and in cross section, respectively. The internal film casing 10 is comprised by a front half 60 and a rear half 62 both formed by injection molding of plastic. The tunnel-like viewfinder 16, the frusto-conical lens bore 22 and the like are formed integrally with the front half 60 upon molding. On the other hand, the rear half 62 of the internal film casing 10 is formed integrally with an exposure chamber 32 which has a front wall 33. The front wall 33 is formed with a circular opening defining an exposure aperture 66 in alignment with the frusto-conical lens bore 22 of the front half 60. Between the front wall 33 and a supporting board 70 attached to the rear half 62 by means of a pair of set screws 72 is a shutter blade 68 to open and close the exposure aperture 66. Between the front wall 33 and the supporting board 70, there is also a well-known diaphragm 78 in front of the shutter blade 68. For example the diaphragm 78 is an iris diaphragm adapted to be varied stepwise in aperture between two different sizes by means of a manually-operable control lever 80. Preferably, the diaphragm is preset to the larger aperture when the film package is sold.

As is shown in FIG. 5, in the supporting board 70, a circular opening 74 is formed in alignment with the exposure aperture 66 of the front wall 33 and the frusto-conical bore 22 of the front half 60 of the internal film casing 10. On the inner surface of the opening 74, there is an annular shoulder 74A against which the outer periphery 14A of the taking lens 14 fits. The taking lens 14 is firmly supported between the shoulder 74A and the rear end of the frustoconical bore 22 when the front and rear halves 60 and 62 are assembled and secured together by means of set screws (not shown).

In the tunnel-like viewfinder 16, there is a transparent plate 82 to which a warning member 84 comprised by a photochromic material is attached substantially at its center. As is well known in the art, since the photochromic material has a transmittance variable depending on the light incident thereto, the warning member 84 becomes visible under bright circumstances such as under a bright open sky and invisible under dark circumstances such as in a room. For the warning member 84, various patterns may be used as is shown in FIG. 6 at (A1), (B1) and (C1), for example.

In the operation of the above-described film package wherein a high speed film is preloaded and the diaphragm is set to the larger aperture, when taking pictures in sunshine, the warning member 84 on the transparent plate 82 becomes visible in the viewfinder 16 to give the photographer a visible warning that the present brightness is too great for the high speed film loaded in the package, and hence that an improper exposure would result, thereby instructing the photographer to operate the diaphragm control lever 80 in order to set the diaphragm to the smaller aperture for a proper exposure.

Figure 6:
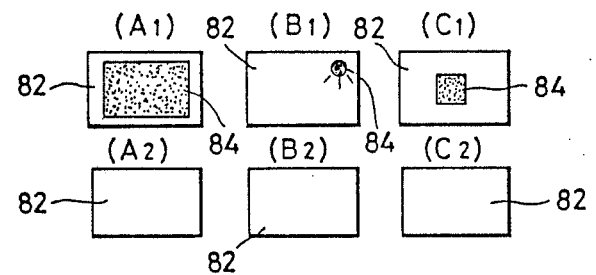
FIG. 6 shows various patterns of warning indications.

On the other hand, when using the film package with the diaphragm set to the larger aperture in a room, the warning member 84 does not appear in the viewfinder 16, as is shown in FIG. 6 at (A2), (B2) and (C2), thereby indicating to the photographer that the diaphragm 78 is to be maintained as set, to the larger aperture. In this case, the film package can give a proper exposure for the previously loaded high speed film even under fluorescent light or the like, that is, without requiring any added artificial illumination.

Figure 7:
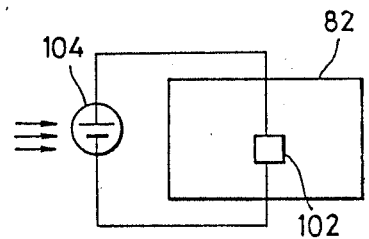
FIG. 7 is a block diagram showing a warning indication device.

The above-described warning member 84 may be replaced by a combination of a liquid crystal plate and a solar cell with the same effect. FIG. 7 shows an example of the warning device comprised by a liquid crystal plate 102 which is transparent when no voltage is applied thereto, and a solar cell 104 disposed at any desired position either on the top wall or on the front wall of the internal film casing 10. The liquid crystal plate 102 is attached as a warning mark to the transparent plate 82 and is driven by the application of voltage from the solar cell 104. The solar cell 104 has a size of e.g. 2×10 mm, which is sufficiently large to produce a sufficient voltage in strong light such as sunlight, but an insufficient voltage in fluorescent light in a room or the like, to drive the warning mark 84 of liquid crystal plate. Therefore, the warning mark 84 becomes opaque and thus visible in the viewfinder 16 when the film package is used in sunshine. The warning mark 84 may be shaped in various patterns shown in FIG. 6 at (A1), (B1) or (C1), or formed by literal indications, for example "OVER" or "UNDER".

The disposable film package of this embodiment can be used in the same way as that of the previous embodiment. When taking pictures in sunshine, the warning mark 84 becomes opaque and dark in the field of the viewfinder 16 as is shown in FIG. 6 at (A1), (B1) or (C1), because of a sufficient voltage from the solar cell 104, thereby to give the photographer a visible warning that the ambient brightness is too great for the high speed film in the camera, and hence that no proper exposure would result. This instructs the photographer to operate the diaphragm control lever in order to set the diaphragm to the reduced aperture for a proper exposure. On the other hand, when using the film package under relatively dark circumstances, the solar cell 104 produces a voltage which is insufficient to drive the warning mark 84 of liquid crystal plate, and so the warning mark 84 is not visible in the viewfinder 16 as is shown in FIG. 6 at (A2), (B2) or (C2). As a result, the photographer will be given no warning and the diaphragm of the film package will be left as initially set.

Referring to FIGS. 8 through 11, there is shown therein the film package of another preferred embodiment of the present invention. As the disposable film package of this embodiment is quite similar to that shown in FIGS. 1 to 3, the following description will be directed in particular to elements forming different parts from those of the film package of FIGS. 1 to 3.

In the disposable film package of this embodiment, a viewfinder 116 is located just above the taking lens 16 and is provided with a transparent window plate 140. Inside the film casing 10, there is a variable diaphragm means between the transparent window plate 140 and the taking lens 14 shown in detail in FIG. 9. The variable diaphragm means comprises a slidable plate 134 having a rack 142 along the lower edge thereof, a diaphragm plate 146 having a rack 148 along the upper edge thereof, and a pinion gear 144 mounted on a fixed shaft (not shown) operatively interconnecting the slidable plate 134 and the diaphragm plate 146. The sliding plate 134 is divided into two sections, namely an upper half section 134A which is transparent and provided with a literal indication such as "CLEAR" or "BRIGHT" and a lower half section 134B which is opaque to light. The diaphragm plate 146 has two openings 150, 152 therethrough by which different sizes of diaphragm apertures are defined. Substantially corresponding to the upper and lower half sections 134A and 134B of the sliding plate 134, the transparent plate 140 is also divided into two sections, namely an upper half section 140A and a lower half section 140B wherein a literal indication such as "RAIN" or "DARK" is provided. The sliding plate 134 is supported by upper and lower rails 136 and 138 for lateral sliding movement, from the right to the left as viewed in FIG. 9.

Figure 8:
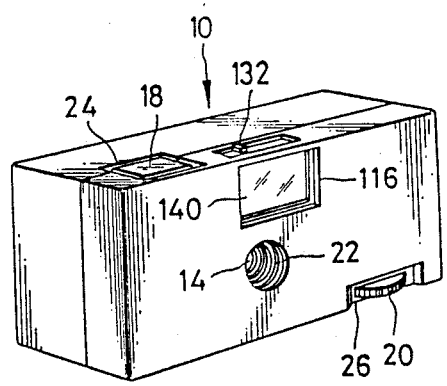
FIG. 8 is a perspective view of the film package of another embodiment of the invention.
Figure 9:
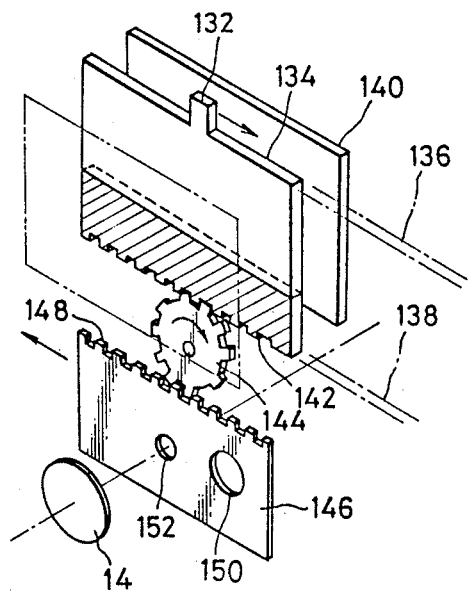
FIG. 9 is an exploded perspective view illustrating indication means and exposure control means.
Figure 10:
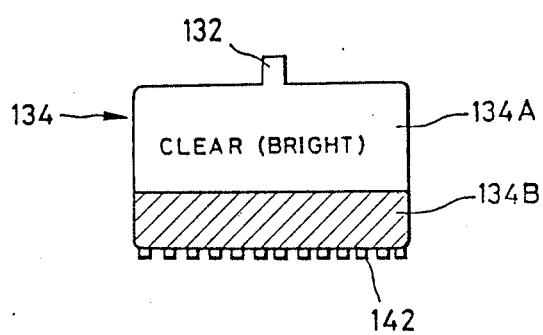
FIGS. 10 through 15 are views illustrating various examples of indicating members.

As is seen in FIG. 8, an operating knob 132 is provided on the upper edge of the sliding plate 134 and projects outside of the internal film casing 10 for manual operation. Owing to the above-mentioned rack and pinion mechanism, when manually moving the knob 132, and hence the sliding plate 134, from the right to the left, the diaphragm plate 140 is moved from the left to the right. At the extremities of the movement of the sliding plate 134, the diaphragm plate 146 is positioned so as to selectively align the diaphragm apertures 150 and 152 with the taking lens 14. When the sliding plate 134 is in its right end position shown in FIG. 9, the sliding plate 134 overlaps the transparent plate 140 and therefore intercepts the light passing through the lower half section 140B of the transparent plate 140. On the other hand, when the sliding plate 134 is manually moved to its left end position, the sliding plate 134 moves aside the transparent plate 140 so as to make it possible to see the literal indication of "RAIN" or "DARK" in the viewfinder 16.

In operation of the disposable film package of this embodiment, when the operation knob 132 is positioned in the "CLEAR" position, i.e. its right end position, the sliding plate 134 is so placed as to overlap the transparent plate 140, so as to intercept the light passing through the lower half section 140B of the transparent plate 140 by the lower half section 134B of the sliding plate 134. As a result, the literal indication "CLEAR" and "BRIGHT" can be viewed in the viewfinder 16 and the smaller diaphragm aperture 152 is brought into alignment with the taking lens 14. If the film package is used under dark circumstances, the literal indication "CLEAR" or "DARK" gives the photographer a caution that the film will be underexposed. Therefore, the photographer moves the knob 132 to the "RAIN" or "DARK" position, i.e. the left end position, so as to align the larger diaphragm aperture 150 with the taking lens 14. On the other hand, if the literal indication "RAIN" or "DARK" is viewed in the viewfinder 16, and hence the larger diaphragm aperture 150 is maintained in alignment with the taking lens 14 although the film package is used under clear open sky, the photographer's attention is called to a change of diaphragm aperture from large to small. It will be understood by those skilled in the art that, in this embodiment, the rack and pinion mechanism can be replaced by a link mechanism, a wire transmission mechanism or the like which are all well known per se.

Figure 12:
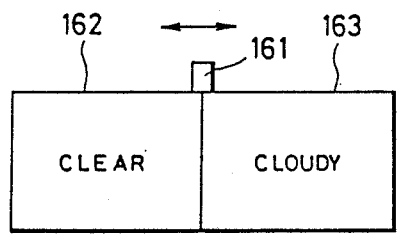

For the sliding plate 134, various forms of indicia can be used, as shown in FIGS. 12 to 15. FIG. 12 shows a transparent sliding plate comprising a right side half section 162 having an indication "CLEAR" thereon and a left side half section 163 having an indication "CLOUDY". AT the middle of the upper edge of the transparent sliding plate is an operating knob 161 operable outside the film casing 10. By moving the transparent sliding plate, the indications are selectively placed in the viewfinder 16. In this case, the transparent plate 140 fixed to the inside of the viewfinder 16 can be omitted.

Figure 13:
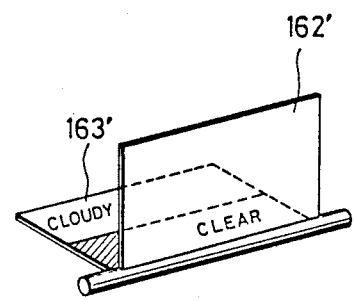
Figure 11:
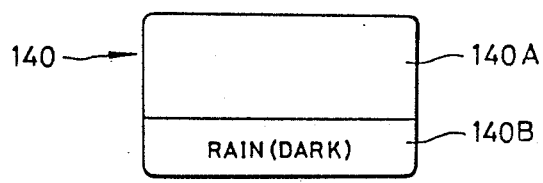

FIG. 13 shows another example of indicia, comprising a transparent plate 162' having an indication "CLEAR" and a partly transparent plate 163' having an indication "CLOUDY" on the transparent part, which are attached to a shaft at right angles to each other. According to this example, each indication can be shown in the viewfinder 16 by turning the shaft through approximately 90°.

Figure 14:
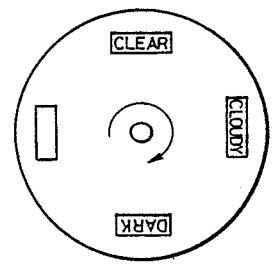

FIG. 14 shows still another example of indicia, comprising a rotary disk having a plurality of indications, for instance "CLEAR", "CLOUDY", and "DARK", at regular angular distances.

Figure 15:
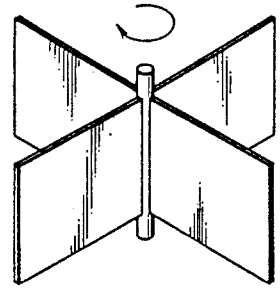

FIG. 15 shows a further example of indicia, comprising a vaned wheel having four transparent plates to each of which an appropriate indicium may be applied.

The indicia shown in FIGS. 14 and 15 are quite useful for providing an increased number of indicia.

It is to be noted that, because of the distance between the indicia and an observing point shorter than the least distance of distinct vision in any example described above, it is desirable to provide an appropriate optical viewing system for a distinct observation of the indicia.

Although the present invention has been fully described by way of the preferred embodiments thereof with reference to the accompanying drawings, it is to be noted that various changes and modifications will be apparent to those skilled in the art. For example it is to be understood that the film cartridges and films themselves may take any of various forms well known to those skilled in the art and already commercially available. Therefore, unless otherwise such changes and modifications depart from the scope of the present invention, they should be construed as included therein.

What is claimed is:

1. A photographic film package of the type having a taking lens comprising:
    a film casing;
    a removable film cartridge containing a high speed film therein in said film casing;
    a viewfinder;
    selection means movable by a user of the film package for selectively indicating any one of a plurality of different conditions of scene brightness in said viewfinder according to the user's estimate of actual ambient scene brightness, said selection means comprising at least one transparent member bearing thereon an indication of scene brightness which is selectively movable into and out of the field of view of the viewfinder; and
    exposure control means responsive to said selection means to change exposure conditions.

2. A photographic film package as claimed in claim 1, in which said selective indicating means is mechanically coupled to said exposure control means such that movement of said indicating means to a position to display information as to a given scene brightness moves said exposure control means to a position to provide an exposure appropriate for said given scene brightness.

3. A photographic film package of the type having a taking lens, comprising:
    a film casing;
    a film cartridge containing a high speed film therein in said film casing;
    a viewfinder formed in said film casing; and
    a photochromic member which changes its transmittance according to said scene brightness, said photochromic member being disposed in said viewfinder thereby visibly to indicate scene brightness.

4. A photographic film package as claimed in claim 3, in which said photochromic member is of reduced light transmittance when said scene brightness is above a predetermined value and is transparent when said scene brightness is below said predetermined value.

5. A photographic film package as claimed in claim 3, wherein said viewfinder comprises a transparent plate and said photochromic member is smaller than and attached to said transparent plate, whereby only a portion of a scene visible in said viewfinder is covered by said photochromic member.

6. A photographic film package of the type having a taking lens, comprising:
    a film casing;
    a film cartridge containing a high speed film therein in said film casing;
    a viewfinder formed in said film casing;
    a liquid crystal plate disposed in said viewfinder which is smaller than the field of view in said viewfinder and which changes in appearance with scene brightness; and
    a solar cell hat drives said liquid crystal plate to change in appearance.

7. A photographic film package as claimed in claim 6, wherein said liquid crystal plate becomes visible when said scene brightness is above a predetermined value and transparent when said scene brightness is below said predetermined value.

8. A photographic film package of the type having a taking lens, comprising:
    a film casing;
    a film cartridge containing a high speed film therein in said film casing;
    a viewfinder formed in said film casing;
    a liquid crystal plate disposed in said viewfinder which is of reduced light transmittance when said scene brightness is above a predetermined value and is transparent when said scene brightness is below said predetermined value, thereby visibly to indicate scene brightness; and
    a solar cell that drives said liquid crystal plate to reduce its light transmittance.

* * * * *